(12) United States Patent
Nandu et al.

(10) Patent No.: US 6,346,560 B1
(45) Date of Patent: Feb. 12, 2002

(54) METHOD FOR SELECTING CONTACT LENS MATERIALS TO MINIMIZE CORNEAL STAINING

(75) Inventors: Mahendra P. Nandu; Eric J. Leibenguth, both of Rochester, NY (US)

(73) Assignee: Bausch & Lomb Incorporated

( * ) Notice: Subject to any disclaimer, the term of this patent is extended or adjusted under 35 U.S.C. 154(b) by 0 days.

(21) Appl. No.: 09/567,991

(22) Filed: May 10, 2000

(51) Int. Cl.⁷ .................................................. G02C 7/04
(52) U.S. Cl. .................. 523/106; 264/1.32; 351/106 H; 424/429
(58) Field of Search ........................ 523/106; 269/1.32; 351/106 H; 424/429

(56) References Cited

U.S. PATENT DOCUMENTS 5,776,999 A 7/1998 Nicolson et al. ............ 523/106

*Primary Examiner*—Peter Szekely
(74) *Attorney, Agent, or Firm*—Robert B. Furr, Jr.; Denis A. Polyn

(57) ABSTRACT

The invention provides a method for selecting contact lenses to reduce corneal staining. The method selects contact lens materials based upon the ratio of the water diffusion coefficient to the ion diffusion coefficient.

13 Claims, 2 Drawing Sheets

METHOD FOR SELECTING CONTACT LENS MATERIALS TO MINIMIZE CORNEAL STAINING

CROSS-REFERENCE TO RELATED APPLICATIONS

This application is related to commonly-assigned applications U.S. Ser. Nos. 09/568,290 and 09/567,931 filed on even date herewith.

BACKGROUND

Soft contact lenses made from thin high water content hydrogels are prone to corneal staining. Besides other factors, water flux through hydrogels and tonicity of the post lens tear film are believed to contribute to corneal staining. It would therefore be desirable to quantify in-vitro flux and diffusion coefficients of sodium chloride and water through hydrogels and relate this to the degree of corneal staining.

U.S. Pat. No. 5,776,999 to Nicolson et al. discloses a method for screening materials for use as extended-wear ophthalmic lenses.

A number of causes for disturbances to the epithelium secondary to hydrogel contact lens wear have been reported in the literature. These include mechanical irritation, chemical irritation and toxicity, epithelial edema and localized corneal drying. Epithelial staining may occur as a result of one or a combination of these factors.

The literature has also reported incidents of corneal epithelial erosions on wearing thin high water content hydrogel lenses. A comparison of corneal staining in these lenses (Permalens 71% water, Duragel 75% water) reveals the fact that the degree of corneal staining is related to the water content of these hydrogel lenses. Since the dehydration rate of the anterior surface of hydrogel lenses is proportional to their water content, it has been postulated that this evaporation draws water from the back of the lens to the front, leading to corneal damage. It has been suggested that there are patient factors, lens factors, and environmental factors that influence the occurrence of corneal staining with very thin high water content lenses. Thus it would be desirable to provide a method for selecting contact lens materials to reduce the incidence of corneal staining.

SUMMARY OF THE INVENTION

The invention also provides a method for selecting contact lens materials for contact lenses to reduce corneal staining. In a first embodiment, the invention provides a method for selecting contact lens materials to reduce corneal staining comprising the steps of:

(a) providing a sample of a contact lens material;
(b) determining the water diffusion coefficient of said hydrogel contact lens material;
(c) determining the sodium chloride diffusion coefficient of said contact lens material; and
(d) selecting said contact lens material to reduce corneal staining if the ratio of said water diffusion coefficient to said sodium chloride diffusion coefficient exceeds a predetermined value.

In a second embodiment, the method of the invention comprises:

(a) defining a calibration algorithm to relate the NMR spectra of at least three known concentrations $H_2O$ in solution with $D_2O$, wherein the concentration of $D_2O$ is greater than the concentration of $H_2O$;
(b) providing a first cell containing a first aqueous solution;
(c) providing a second cell containing a second solution comprising $D_2O$;
(d) equilibrating a first sample of said contact lens material in $D_2O$ and positioning said equilibrated first sample of contact lens material at an interface between said first cell and said second cell to permit diffusion across said equilibrated contact lens material;
(e) measuring the NMR spectrum of said second solution;
(f) calculating the concentration of hydrogen ions in said second cell by applying the calibration algorithm of step (a) to said NMR spectrum of said second solution;
(g) calculating the water diffusion coefficient of said contact lens material sample based upon the hydrogen ion concentration calculated in step (f);
(h) providing a third cell containing a third aqueous solution containing a halide salt;
(i) providing a fourth cell containing a fourth aqueous solution such that the concentration of halide salt in said third aqueous solution is greater than the concentration of halide salt in said fourth aqueous solution;
(j) equilibrating a second sample of said contact lens material in water and positioning said second equilibrated sample of said contact lens material at an interface between said third cell and said fourth cell to permit diffusion across said second equilibrated sample of said contact lens material;
(k) withdrawing a sample of said fourth aqueous solution from said fourth cell;
(l) admixing said withdrawn sample of step (k) with a known quantity of an acid reagent;
(m) measuring the halide ion concentration of said admixed sample of step (l) by titrating said admixed sample by passing a substantially constant electric current between a silver-containing anode and a cathode in contact with said admixed sample;
(n) repeating the sampling and titration steps (k), (l) and (m) to obtain the halide ion concentration in said second fourth solution as a function of time;
(o) calculating the halide ion diffusion coefficient of said contact lens material using the halide ion concentrations obtained in step (n); and
(p) dividing the water diffusion coefficient of step (g) by the halide ion diffusion coefficient of step (o) to obtain a corneal staining ratio; and
(q) selecting said contact lens material to reduce corneal staining if the corneal staining ratio in step (p) exceeds a predetermined value.

DETAILED DESCRIPTION

The flux of water or chloride ions through hydrogel membranes was determined by the equation $$J = m/t A \qquad (1)$$

where

J=Flux in mg/hr cm²
m=mg of sodium chloride or water permeated through sample
A=Available area in cm²
t=Time in hours Knowing the flux J, the diffusion coefficient D, was calculated using Ficks first law of difussion.

$$D = J\frac{\Delta x}{\Delta c} \quad (2)$$

where

D=Diffusion coefficient in cm²/hr.
Δx=Membrane thickness in cm
Δc=Concentration gradient across the membrane in mg/cm³

For the determination of water flux (and $D_{H_2O}$) through the biocompatible material, a Varian model EM 360A-1711 NMR spectrometer (commercially available from Varian, Inc., 3120 Hansen Way, Palo Alto, Calif. 94304) was used to measure the increase in the hydrogen ion concentration of the receptor compartment. For determination of sodium chloride flux (and $D_{NaCl}$), a Haach-Buchler Model 442-5000 chloridometer (commercially available from Haach-Buchler, Saddle Brook, N.J 07662) was used to measure the increase in the chloride concentration of the receiver compartment.

Figure 1:
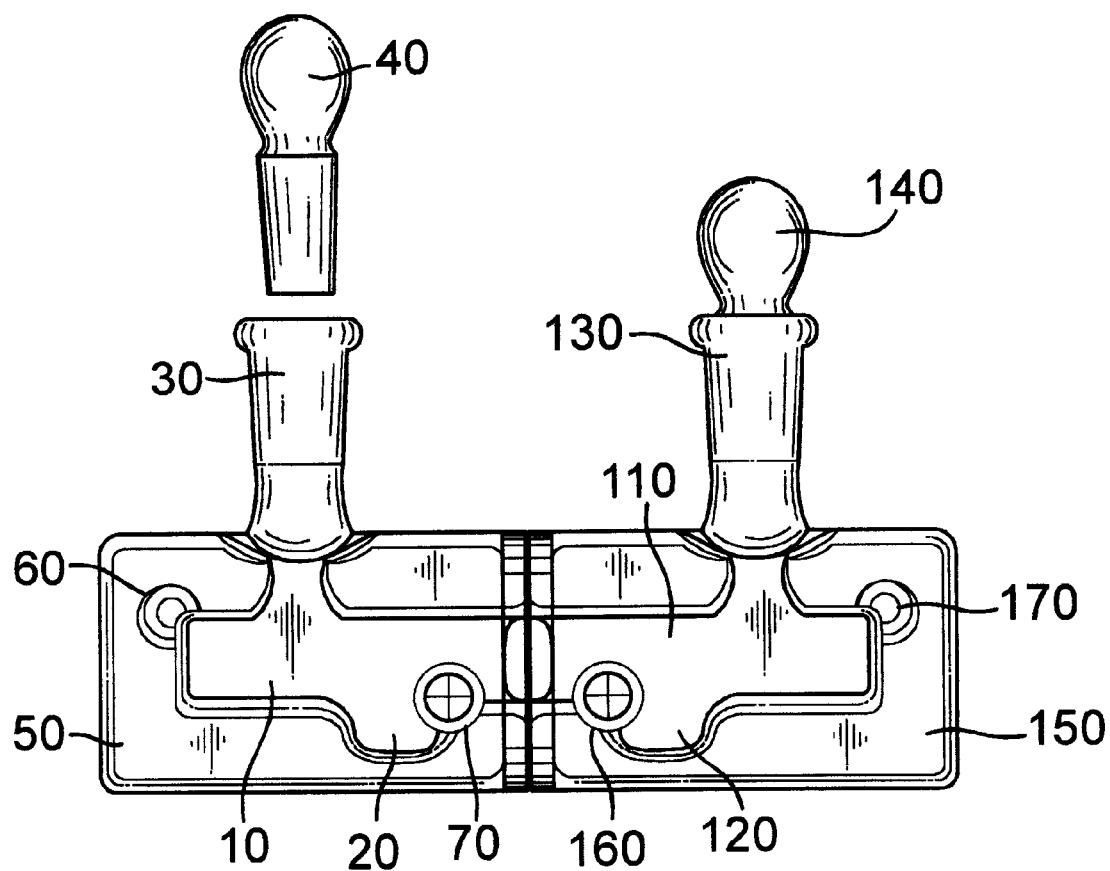
FIG. 1 shows a simplified schematic diagram of one embodiment of a diffusion cell apparatus useful in accordance with the present invention.

FIG. 1 illustrates a simplified diagram of a preferred diffusion cell apparatus useful in accordance with the present invention. Donor cell 10 and receiver cell 110 are mirror images of each other. Donor cell 10 includes stirring well 20 and port 30, which is equipped with removable stopper 40. Stirring well 20 contains a magnetic stirrer (not shown). Donor cell 10 is surrounded by heat transfer jacket 50, which includes heat transfer fluid inlet line 60 and heat transfer fluid outlet line 70. A ground glass flange (not shown) of donor cell 10 fits against a matching ground glass flange (not shown) of receiver cell 110. The ground glass flanges may optionally be recessed to receive a material sample for diffusion testing. Alternatively, the flanges may be ground flat to hold the material sample between the opposing flat ground surfaces.

Receiver cell 110 includes stirring well 120 and port 130, which is equipped with removable stopper 140. Stirring well 120 contains a magnetic stirrer (not shown). Receiver cell 110 is surrounded by heat transfer jacket 150, which includes heat transfer fluid inlet line 160 and heat transfer fluid outlet line 170.

In a preferred embodiment, the method of the invention includes replacing a volume of solution in the receiver cells that is substantially equal to the volume of the withdrawn sample. The withdrawn volumes are replaced with fresh solution and the diffusion calculation is adjusted to account for this addition.

The selection criterion of the present invention is a dimensionless number equal to the diffusivity of a sample material for water divided by the diffusivity of that sample material for sodium chloride. This dimensionless number is represented by the ratio $D_{H_2O}/D_{NaCl}$. To select a contact lens material to minimize corneal staining, $D_{H_2O}/D_{NaCl}$ ratios exceeding 3.0 are typically required, with ratios above 5.0 being preferred. Materials having $D_{H_2O}/D_{NaCl}$ ratios of 10.0 or higher are more preferred, and ratios of 11.0 or higher are most preferred.

The term "corneal staining" as used herein refers to disruptions of the corneal epithelium as indicated by uptake of an applied fluorescein dye by damaged cells in the epithelium. In accordance with the invention, it has been found that materials for thin, high water content hydrogel lenses can be selected to minimize corneal damage. It has further been found that the $D_{H_2O}/D_{NaCl}$ ratio of a contact lens material is a previously unrecognized result-effective variable in the selection of contact lens materials.

The following examples measure the amount of water in mg/ml permeating through hydrogel materials into a receiver compartment containing $D_2O$. The following Example 1 shows the NMR technique developed and employed in accordance with the invention.

EXAMPLE 1

Figure 2:
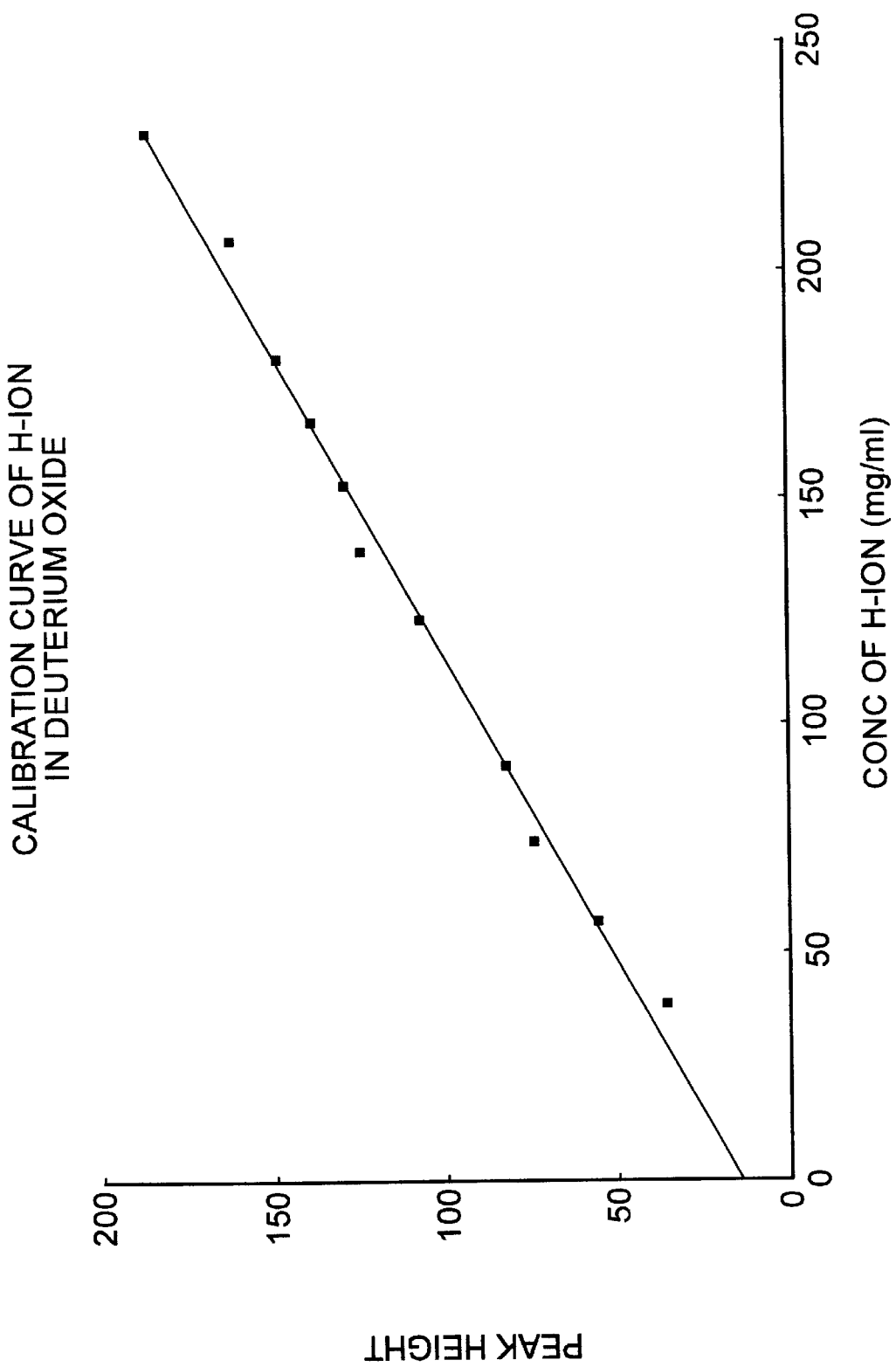
FIG. 2 shows a calibration curve of hydrogen ion peaks for H-ion concentrations in $D_2O$ in accordance with Example 1.

To 0.5 ml of $D_2O$ as a reference sample, known volumes of distilled water were added. The different peak heights for different H-ion concentrations in $D_2O$ were obtained as shown in FIG. 2. A calibration curve was obtained by plotting H-ion concentration in $D_2O$ (mg/ml) vs. peak height as shown in FIG. 2. All instrument parameters were kept constant during the entire operation which included developing a calibration curve and running the test sample. By knowing the peak height of the test sample, the concentration of the water in mg/ml in $D_2O$ could be determined from the calibration curve. Thus, the flux and the $D_{H_2O}$ through hydrogels could be determined using equations 1 and 2.

EXAMPLE 2

In the diffusion studies, hydrogel discs (appropriately equilibrated in $D_2O$ for the water diffusion examples or distilled water for the NaCl diffusion examples) were held between two compartments of a stirred, jacketed diffusion cell. The diffusion cell is commercially available from Crown Glass Company, Inc. of Sommerville, N.J (990 Evergreen Drive, Somerville, N.J 08876). The solutions on both sides were stirred by stirrers to reduce boundary layer effects. The solutions were maintained at a temperature of 32±0.5° C. by circulating water through the jacket.

EXAMPLE 2

Polymacon Hydrogel

The monomer mix was U.V. cured between two glass plates. The films of approximately 0.20 mm thickness were made. The films were boiled in distilled water for 5 hours at 80–85° C. to remove extractables and then equilibrated in distilled water. Circular sections of the equilibrated films were then cut, by using a 9 mm diameter core borer. The thicknesses of the discs were measured by a pneumatically controlled gauge.

During the diffusion experiment, the disc was held between two compartments containing 3 ml of 5% w/v NaCl solution in LHS (donor) and distilled water in the RHS (receiver) compartment. At different time intervals, a sample was drawn from the RHS compartment and analyzed for the milliequivalents (meq) of chloride using the chloridometer. Knowing the meq of chloride, percentage and concentration of NaCl in the RHS compartment were determined. Thus the flux and $D_{NaCl}$ was determined using equations 1 and 2.

For the measurement of $D_{H_2O}$, the discs were equilibrated in $D_2O$. The $D_{H_2O}$ was obtained by the NMR technique as mentioned earlier. Both the experiments were run with at least two discs of different thicknesses and the results are shown in Table 1.

TABLE 1

Diffusion Coefficients of Sodium Chloride and Water
Through Polymacon Hydrogel

SODIUM CHLORIDE

| % Hydration | Thickness, $\mu m$ | $D_{NaCl} \times 10^{-4}$ cm$^2$/hr |
|---|---|---|
| 37.5 | 242.7 ± 3.4 | 5.2 |

WATER

| Thickness $\mu m$ | $D_{H_2O} \times 10^{-3}$ cm$^2$/hr | $D_{H_2O}/D_{NaCl}$ |
|---|---|---|
| 245.5 ± 4.5 | 6.1 ± 0.5 | 11.73 |

EXAMPLE 3

Lidofilcon Hydrogel

The monomer mix was heat cured between two glass plates. The films of three different thicknesses (thin, medium and thick) were made. The films were boiled in distilled water for 5 hours at 80–85° C. to remove extractables and then equilibrated in distilled water. The diffusion experiments on the cast discs and also through double-sided lathed discs were performed in a manner similar to polymacon discs. The results are tabulated in Table 2.

TABLE 2

Diffusion Coefficients of Water
Through Lidofilcon Hydrogels

SODIUM CHLORIDE

| Lidofilcon Hydrogel | Thickness $\mu m$ | Hydration, wt. % | $D_{NaCl} \times 10^{-2}$ cm$^2$/hr |
|---|---|---|---|
| Thin | 94.0 ± 1.0 | 71.6 | 1.0 ± 0.1 |
| Medium | 220 ± 12 | 74.66 | 1.25 ± 0.05 |
| Thick | 864.5 ± 2.4 | 75.45 | 1.5 ± 0.1 |
| Lathed | 439.0 ± 21.8 | 70.80 | 1.9 ± 0.05 |

WATER

| Lidofilcon Hydrogel | Thickness $\mu m$ | $D_{H_2O} \times 10^{-2}$ cm$^2$/hr | $D_{H_2O}/D_{NaCl}$ |
|---|---|---|---|
| Thin | 99.0 ± 5.0 | 2.0 ± 0.1 | 2.0 |
| Medium | 226.5 ± 13.5 | 2.6 | 2.08 |
| Thick | 887.0 | 2.9 ± 0.34 | 1.93 |
| Lathed | 253.7 ± 6.1 | 2.7 ± 0.1 | 1.44 |

EXAMPLES 4 AND 5

HWS-1 and Etafilcon Hydrogels

HWS-1 and Etafilcon are high water content hydrogels sensitive to pH and ionic concentration of the medium in which they are bathed. The HWS-1 material contains 83.5 weight percent HEMA (hydroxy ethyl methacrylate), 10 weight percent IBOMA (isobornyl methacrylate), 0.5 weight percent BME (benzoin methyl ether) (catalyst), 6 weight percent MG (methacryloyl glycine) and 0.5 weight percent EDGMA (ethylene glycol dimethacrylate).

In buffered saline, HWS-1 and Etafilcon hydrate to 60 and 58% water content respectively. However, the water content of these hydrogels is 27.6 and 35.4% respectively in distilled water without previous exposure to the sodium ion. Also, HWS-1 resulted in 23% water content in 5% w/v saline solution. Thus, it is impractical to hydrate these ionic hydrogels in distilled water and run the diffusion experiments in a manner similar to non-ionic Polymacon and Lidofilcon hydrogels. The following approach was adopted to adjust the water content in these ionic hydrogels.

HWS-1 and Etafilcon discs were separately hydrated in known concentration of NaOH solution. pH of the solutions containing the hydrated discs was then adjusted to neutral by slow addition of HCl under stirring such that the resulting solutions had NaCl concentrations of 5% and 1% respectively. The water content of HWS-1 and Etafilcon discs were 60.33 and 57.8% respectively. The shifts in the concentration of NaCl from 5 to 4% for HWS-1 discs and 1 to 0.5% for Etafilcon discs resulted in only slight variation in hydration.

In HWS-1, $D_{NaCl}$ was determined by placing the hydrated disc in between the cell compartments containing 3 ml of 5% NaCl solution in the donor (LHS) compartment and 3 ml of 4% NaCl solution in the receiver (RHS) compartment. An experiment was run for 3.5 hours and an increase in the chloride content in 4% NaCl solution was measured. While calculating the diffusion coefficient, instead of initial gradient in the concentration of NaCl between the two compartments ($\Delta c$ initial), the average gradient in the concentration of NaCl between the two compartments ($\Delta c$ average) at the beginning and end of the experiment was employed in equation 2. At the end of an experiment, noticeable change resulted in the final change in the concentration (($\Delta c$ final). $D_{NaCl}$ of Etafilcon disc was measured in a similar manner except that 1 and 0.5% NaCl solutions were used in the donor (LHS) and the receiver (RHS) compartments respectively. The experiments were run for 5 and 7 hours.

For the determination of $D_{H_2O}$ in HWS-1, LHS cell compartment contained 3 ml of 5% NaCl in water and RHS cell compartment contained 3 ml of 4% NaCl in $D_2O$. The experiment was run for 15 minutes and a sample from RHS compartment was analyzed by NMR to determine $D_{H_2O}$. A calibration curve of H-ion concentration in $D_2O$ was determined by taking 0.5 ml of 4% NaCl in $D_2O$ as a reference sample and then measuring the peak heights of the known concentration of water in the reference sample. A similar approach was followed in the determination of $D_{H_2O}$ in Etafilcon discs. The results are summarized in Table 3.

TABLE 3

Diffusion Coefficients of Water and Sodium Chloride
Through HWS-1 and Etafilcon Hydrogels

SODIUM CHLORIDE

| Hydrogel | Thickness $\mu m$ | Hydration, wt. % | $D_{NaCl} \times 10^{-2}$ cm$^2$/hr |
|---|---|---|---|
| HWS-1 | 198.5 ± 5.5 | 60.65 | 1.0 |
| Etafilcon | 195.0 ± 4.0 | 58.90 | 0.83 ± 0.05 |

WATER

| Hydrogel | Thickness $\mu m$ | $D_{H_2O} \times 10^{-2}$ cm$^2$/hr | $D_{H_2O}/D_{NaCl}$ |
|---|---|---|---|
| HWS-1 | 193.3 ± 8.6 | 1.9 ± 0.25 | 1.90 |
| Etafilcon | 179.0 | 2.1 | 2.53 |

EXAMPLES 6 AND 7

Comparison of $D_{NaCl}$ and $D_{H_2O}$ in hydrated ionic and non-ionic hydrogels of similar water contents.

The objective is to match the water content of non-ionic hydrogel system, for e.g., Lidofilcon and the ionic hydrogel, for e.g., HWS-1 and then compare the values of $D_{NaCl}$ and $D_{H_2O}$ in these systems. Lidofilcon like films of different water contents were obtained by changing monomer compositions of N-vinylpyrollidone (NVP) and methylmethacrylate (MMA). Casting of the films and the determination of $D_{NaCl}$ and $D_{H_2O}$ were followed in the usual manner as described earlier. The details of the different compositions and the diffusion coefficients are shown in Table 4.

TABLE 4

Diffusion Coefficients of Sodium Chloride and Water Through Lidofilcon Type Non-Ionic Hydrogels

SODIUM CHLORIDE

| Hydrogel | Thickness $\mu$m | % Hydration | $D_{NaCl} \times 10^{-2}$ cm$^2$/hr |
|---|---|---|---|
| I | 246.7 ± 0.47 | 73.01 | 1.4 ± 0.25 |
| II | 235.5 ± 0.5 | 67.84 | 1.25 ± 0.05 |
| III | 239.5 ± 1.5 | 62.96 | 0.8 |
| IV | 232.0 ± 6.94 | 58.62 | 0.6 ± 0.08 |

WATER

| Hydrogel | Thickness $\mu$m | $D_{H_2O} \times 10^{-2}$ cm$^2$/hr | $D_{H_2O}/D_{NaCl}$ |
|---|---|---|---|
| I | 243.5 | 2.5 ± 0.1 | 1.79 |
| II | 238.0 | 2.15 ± 0.05 | 1.72 |
| III | 238.0 | 1.6 ± 0.01 | 2.0 |
| IV | 231.0 ± 7.0 | 1.35 ± 0.15 | 2.25 |

Results and Discussion

In Lidofilcon hydrogels, the values for $D_{NaCl}$ and $D_{H_2O}$ (Table 2) are approximately 30× and 4× greater then the respective values for Polymacon (Table 1). Also, the value of $D_{H_2O}/D_{NaCl}$ in Polymacon hydrogels is 11.78 in contrast to the maximum value of 2.08 Lidofilcon hydrogels. The fact that corneal staining is observed on wearing Lidofilcon lenses whereas absence of staining with Polymacon lenses points to the importance of lower value of $D_{H_2O}$ and $D_{NaCl}$ and higher value of $D_{H_2O}/D_{NaCl}$ which is believed to be one of the factors contributing to corneal staining.

The Lidofilcon double-sided lathed discs showed higher values of both $D_{NaCl}$ as well as $D_{H_2O}$ compared to the cast discs. This finding correlates well with the clinically observed phenomena that Lidofilcon double-sided lathed lenses have a greater tendency to stain than Lidofilcon cast molded lenses of the same design.

The cast Lidofilcon thin showed lower values for $D_{NaCl}$ and $D_{H_2O}$ compared to Lidofilcon medium and thick. Lidofilcon lathed discs gave a lower value for $D_{H_2O}/D_{NaCl}$ when compared to cast discs.

In the comparison of ionic hydrogels (Table 3) a higher value of $D_{H_2O}/D_{NaCl}$ was observed in Etafilcon as compared to HWS-1. Also the value of $D_{H_2O}/D_{NaCl}$ in these hydrogels is low compared to $D_{H_2O}/D_{NaCl}$ of Polymacon which is 11.73.

Table 4 shows details on the $D_{NaCl}$ and $D_{H_2O}$ through Lidofilcon type non-ionic hydrogels. An increase in the composition of MMA (methyl methacrylate) from I to IV resulted in the leathery hydrogels with a decrease in the water content. As expected, the decrease in the water content of the hydrogels resulted in the lower values for $D_{NaCl}$ and $D_{H_2O}$. Except for the hydrogel II, the higher values for $D_{H_2O}/D_{NaCl}$ were observed with a decrease in the water content of the hydrogels. Averaging the results of the formulations III and IV gave 60.79% hydration which is close to HWS-1 and values for $D_{NaCl}$ and $D_{H_2O}$ as 0.007 and 0.015 cm2/ hr. respectively. The lower value of 0.007 for $D_{NaCl}$ and 0.015 for $D_{H_2O}$ as compared to 0.01 and 0.02 in HWS-1 seems to indicate that non-ionic systems like Lidofilcon with a water content of around 55–60% would probably be a better choice than the ionic system like HWS-1 lowering the effect of corneal staining.

REFERENCES

1. L. Kline and t. DeLuca, An analysis of arcuate staining with the B&L Soflens—Part I, J. Am Optom. Assoc.; 46 (1975) 1126.
2. R. Miller, F. Brightbill and S. Slama, Superior limbic kerato-conjunctivitis in soft contact lens wearers, Cornea; 1 91982) 293.
3. D. Feurst, J. Sugar and S. Worobec; Superior limbic kerato-conjunctivitis associated with cosmetic soft contact lens wear, Arch. Ophthalmol; 101 (1983) 1214.
4. K. Zadinik and D. Mutti; Inferior arcuate corneal staining in soft contact lens wearers, Int. Contact Lens Clin.; 12 (1985) 110.
5. L. Kline, T. DeLuca and G. Fishberg; Corneal staining relating to contact lens wear, J. Am. Optom. Assoc.; 50 91979) 353.
6. B. Holden, D. Sweeney, A. Vannas, K. Nilsson and N. Efron; effect of long term extended contact lens wear on the human cornea, Invest. Ophthalmol. Vis. Sci.; 26 91985) 1489.
7. S. Zantos, G. Orsborn, H. Walter and H. Knoll; Studies on corneal staining with thin hydrogel contact lenses, Journal of the B.C.L.A., 9 (1986) 61.
8. W. Bachman and G. Wilson; Essential ions for maintenance of the corneal epithelial surface, Invest. Ophthalmol. Vis. Sci.; 26 91985) 1484.
9. S. Prabhakar and B. Misra; studies on the structural kinetic and thermodynamic parameters of cellulose acetate membranes, J. Membrane Sci.; 29 (1986) 143.

We claim:

1. A method for selecting contact lens materials to reduce corneal staining comprising the steps of:
   (a) providing a sample of a contact lens material;
   (b) determining the water diffusion coefficient of said contact lens material;
   (c) determining the sodium chloride diffusion coefficient of said contact lens material; and
   (d) selecting said contact lens material to reduce corneal staining if the ratio of said water diffusion coefficient to said sodium chloride diffusion coefficient exceeds a predetermined value.

2. The method of claim 1 wherein said contact lens material is a hydrogel.

3. The method of claim 1 wherein the ratio of step (d) is at least 3.0.

4. The method of claim 3 wherein the ratio of step (d) is at least 5.0.

5. The method of claim 4 wherein the ratio of step (d) is at least about 10.0.

6. The method of claim 5 wherein the ratio of step (d) is at least about 11.0.

7. The method of claim 6 wherein said step (b) further comprises measuring the NMR spectrum of a solution comprising water and $D_2O$.

8. A method for selecting a contact lens material to reduce corneal staining comprising the steps of:

(a) defining a calibration algorithm to relate the NMR spectra of at least three known concentrations $H_2O$ in solution with $D_2O$, wherein the concentration of $D_2O$ is greater than the concentration of $H_2O$;

(b) providing a first cell containing a first aqueous solution;

(c) providing a second cell containing a second solution comprising $D_2O$;

(d) equilibrating a first sample of said contact lens material in $D_2O$ and positioning said equilibrated first sample of said contact lens material at an interface between said first cell and said second cell to permit diffusion across said equilibrated contact lens material;

(e) measuring the NMR spectrum of said second solution;

(f) calculating the concentration of hydrogen ions in said second cell by applying the calibration algorithm of step (a) to said NMR spectrum of said second solution;

(g) calculating the water diffusion coefficient of said contact lens material sample based upon the hydrogen ion concentration calculated in step (f);

(h) providing a third cell containing a third aqueous solution containing a halide salt;

(i) providing a fourth cell containing a fourth aqueous solution such that the concentration of halide salt in said third aqueous solution is greater than the concentration of halide salt in said fourth aqueous solution;

(j) equilibrating a second sample of said contact lens material in water and positioning said equilibrated second sample of said contact lens material at an interface between said third cell and said fourth cell to permit diffusion across said equilibrated second sample of said contact lens material;

(k) withdrawing a sample of said fourth aqueous solution from said fourth cell;

(l) admixing said withdrawn sample of step (k) with a known quantity of an acid reagent;

(m) measuring the halide ion concentration of said admixed sample of step (1) by titrating said admixed sample by passing a substantially constant electric current between a silver-containing anode and a cathode in contact with said admixed sample;

(n) repeating the sampling and titration steps (k), (l) and (m) to obtain the halide ion concentration in said fourth solution as a function of time;

(o) calculating the halide ion diffusion coefficient of said contact lens material using the halide ion concentrations measured in step (n); and (p) dividing the water diffusion coefficient of step (g) by the halide ion diffusion coefficient of step (o) to obtain a corneal staining ratio; and (q) selecting said contact lens material to reduce corneal staining if the corneal staining ratio of said contact lens material exceeds a predetermined value.

9. The method of claim 8 wherein said contact lens material is a hydrogel.

10. The method of claim 9 wherein the ratio of step (q) is at least 3.0.

11. The method of claim 10 wherein the ratio of step (q) is at least 5.0.

12. The method of claim 11 wherein the ratio of step (q) is at least about 10.0.

13. The method of claim 12 wherein the ratio of step (q) is at least about 11.0.

* * * * *